Patented May 10, 1938

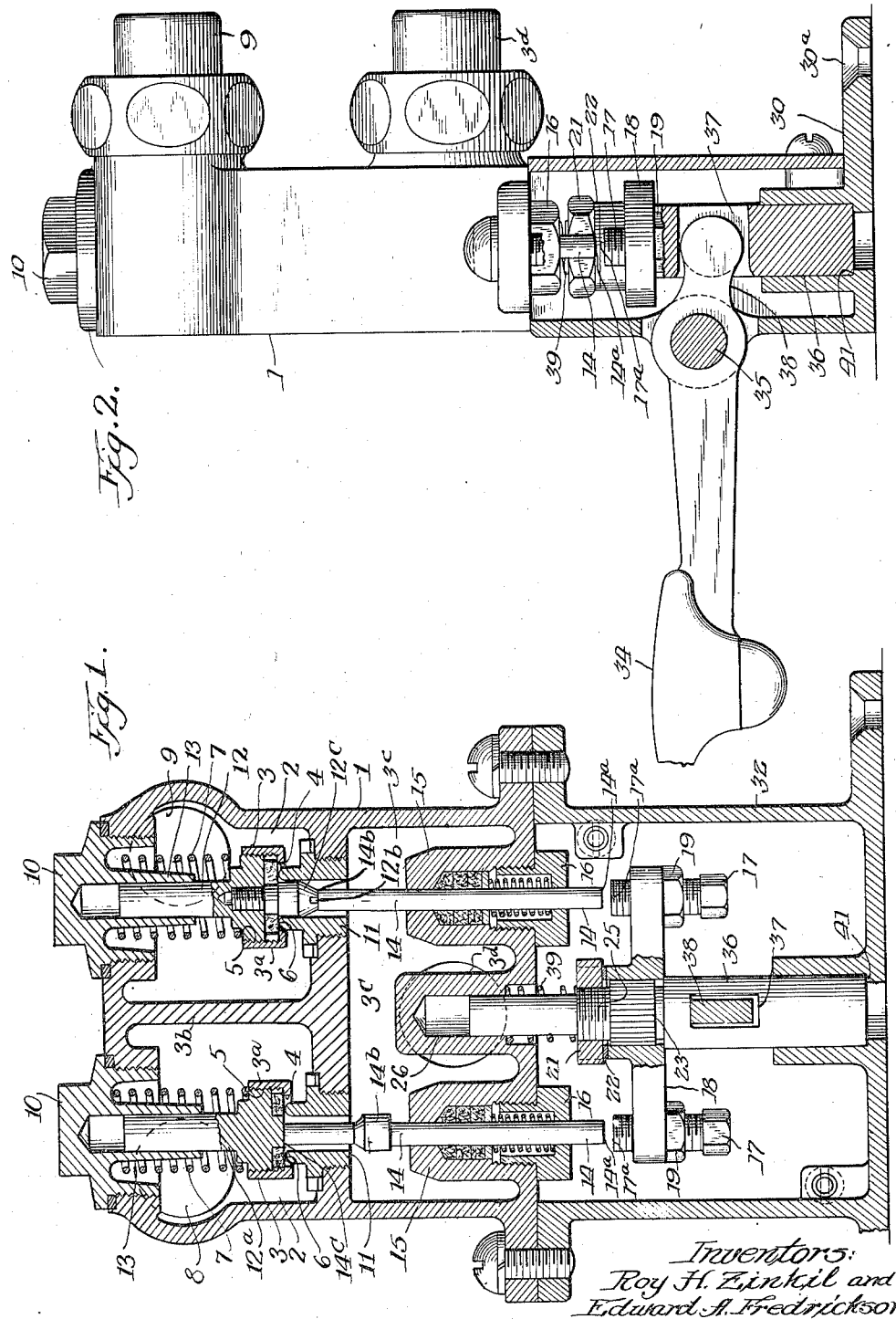

2,116,806

UNITED STATES PATENT OFFICE 2,116,806

MIXING VALVE

Roy H. Zinkil, Oak Park, and Edward A. Fredrickson, Chicago, Ill., assignors to Crane Co., Chicago, Ill., a corporation of Illinois Original application June 11, 1934, Serial No. 730,004, now Patent No. 2,094,288, dated September 28, 1937. Divided and this application November 13, 1936, Serial No. 110,582

1 Claim. (Cl. 277—18)

This invention relates to valves and more particularly to a valve constructed in a new manner and is a division of our co-pending application, Serial No. 730,004, filed June 11, 1934, and now Patent No. 2,094,288, granted September 28, 1937, for a mixing valve.

Our invention relates to that type of pedal operated mixing valve in which hot and cold water are brought together from each of their respective supply pipes into a common chamber within the valve proper.

More particularly, the primary purpose of our invention is to provide for an accurate, convenient and more easily controlled mechanical means for varying the temperature of the mixed water.

Another important object is to provide for a construction in which the adjustment of the respective hot and cold water valves is also readily accessible after installation, comprising a removable or separable floor housing preferably independent of the valve chamber proper.

Another important object is to obtain the quick opening with a relatively small movement of the actuating means of both valves with a smooth and uniform action, functioning by means of a pivotable pedal.

Another object is to provide certain improvements in mixing valves of this character affording ease of installation upon the floor adjacent to the fixture.

We attain these objects by mechanism similar to that illustrated in the accompanying drawing, in which Fig. 1 is a front, vertical, sectional view of the internal relation of the valves and their controlling parts within the respective valve chamber and housing and in which the mode of operation is obtained by means of a pivotable pedal action for foot operation.

Fig. 2 is a view partly in side elevation and partly in side vertical section of the embodiment shown in Fig. 1.

Similar numerals refer to similar parts throughout the views.

Referring to Fig. 1, the body or housing 1 of the valve comprises a plurality of parallel positioned valve chambers 2 at its upper portion, containing the valve members 3 consisting preferably of a disc retaining ring 3a for the purpose of retaining a composition disc 4 by means of the threads 5. These valves more specifically are guided for reciprocatory movement and are of a poppet type, seating downwardly against the valve seats 6 under the action of the springs 7. The valve chambers 2 have lateral inlets 8 and 9 adapted to be connected with the respective cold and hot water supply pipes (indicated but not shown).

The upper ends of the valve chambers are closed by means of the plugs 10, which retain the springs 7, the plugs being preferably removable in order to gain access to the valve members and springs without necessitating disconnection of the valve chamber from the floor itself. The valve members 6 preferably seat against renewable seat rings 11, which are preferably threadedly attached to the casing 1.

Each of the respective poppet valves is guided by the extension rods 12 and 12a which move in reciprocating manner as journalled within the respective bores 13 of the caps 10, the purpose of the rods being to guide and to thereby prevent a wobbling movement of the valve as each returns to its seat 6 under the action of the spring. The guide member 12, as previously mentioned, is threaded to provide for the retaining means 3 for the renewable disc 4. In referring to the valve shown in the right hand portion of Fig. 1, the guide member 12 is provided with a frustro-conical extension 12c against which the push rod 14 rests when the valve is installed in its normal position. The member 12c is preferably threadedly attached to the guide means by screwdriver slot 12b. This construction applies to the valve controlling the supply of hot water.

Referring to the left hand or cold water side of the Fig. 1 as designated by numeral 8, the guide 12a therein is made to permit the tappet rod 14b to bear against the latter as at 14c. The reason for the difference in the construction shown is to prevent the wrongful positioning of the respective valves. The tappet rod 14b, as indicated, is provided preferably integrally with an enlargement thereon for the purpose of diminishing the supply of cold water as the valve approaches its maximum movement in opening, while the hot water under the same movement and by reason of the same form of enlargement attached to the guide member 12 increases in its volume in the amount of water entering through the seat opening as it is gradually being opened. Briefly, so far as respective volume control is concerned, their action is reciprocal although this relationship as mentioned may be materially changed by the positioning of the threaded adjusting screws hereinafter described.

The elongated push rods or valve actuating means 14 are each journalled within a spring-loaded stuffing box 15 extending through and beyond the bushing 16 into the interior of the lower housing, and are made of such length so as to permit the necessary clearance between the adjusting screw 17 and the end of the respective rod 14a. A crosshead member 18 supports the adjusting screws 17 in locked or non-rotatable engagement by means of the locknuts 19 and is attached to the central operating means by a nut and washer, respectively designated as 21 and 22, and also held in non-rotatable position, as indicated. The upper end of the broached head 23 has the thread member 25 preferably made for guidance within the hollow guide 26.

It is apparent that the respective valve rods 14 being operated by depressing the foot pedal designated as 34, which is hingedly attached to the housing 32 as shown at 35, thereby engages the slidable assembly 36 by means of the slotted connection 37 which assembly consists of the slot and the complementary lever extension 38. The spring 39 tends to keep the extension 36 bearing against the shoulder 41 and by depressing the pedal 34 the respective extension stems are lifted axially until such time as the valves 3 are raised from the seats, thus admitting the desired amount of hot and cold water respectively.

It is obvious that the amount of depression of the respective valves is easily controllable by means of the fine adjustment permissible on the adjusting screws 17 mounted upon the crosshead 18.

Thus the temperature of the water and also the amount thereof entering the upper chamber 3c and discharging through the outlet 3d is conveniently controlled and handled.

It is apparent that our invention is capable of numerous modifications falling within its spirit and we desire, therefore, to be limited only to the extent of the appended claim.

We claim:

In a mixing valve comprising a casing having hot and cold fluid inlets thereto and a fluid outlet or outlets therefrom, a housing adjacent to the said casing and having a forward, vertically extending wall, simultaneously operable valves for the control of fluids through said inlets, a crosshead reciprocably movable and journally guided within the interior lower portion of the said housing, the said crosshead being actuated by a single pivotable pedal operable exteriorly of said housing the said pedal being limited to downward movement and mounted upon said vertically extending wall, the said crosshead having independently adjustable means cooperating with the said pedal for accomplishing the time of movement and regulating the travel of the said valves, the latter having extending portions projecting within said housing, the said extending portions serving as means for contacting with the said adjustable means of the crosshead.

ROY H. ZINKIL.
EDWARD A. FREDRICKSON.